United States Patent
Guth et al.

(10) Patent No.: US 6,190,639 B1
(45) Date of Patent: Feb. 20, 2001

(54) PROCESS FOR THE PREPARATION OF MESOPOROUS MOLECULAR SIEVES AND POROUS CRYSTALLINE MATERIALS

(75) Inventors: Jean-Louis Guth; Laurent Georges Huve; Anne-Claude Voegtlin, all of Grand Couronne (FR)

(73) Assignee: Shell Oil Company, Houston, TX (US)

(*) Notice: Under 35 U.S.C. 154(b), the term of this patent shall be extended for 0 days.

(21) Appl. No.: 09/351,609

(22) Filed: Jul. 12, 1999

Related U.S. Application Data

(63) Continuation-in-part of application No. 08/818,854, filed on Mar. 17, 1997.

(51) Int. Cl.⁷ .................................................. C01B 33/26
(52) U.S. Cl. ...................... 423/702; 423/705; 423/328.1; 423/328.2
(58) Field of Search ................................... 423/702, 704, 423/705, 328.1, 328.2

(56) References Cited

U.S. PATENT DOCUMENTS

| | | | |
|---|---|---|---|
| 5,238,676 | * | 8/1993 | Roth et al. . |
| 5,538,710 | * | 7/1996 | Guo et al. . |
| 5,589,153 | * | 12/1996 | Garces et al. . |
| 5,622,684 | * | 4/1997 | Pinnavaia et al. . |
| 5,800,799 | * | 9/1998 | Pinnavaia et al. . |
| 5,840,264 | * | 11/1998 | Pinnavaia et al. . |
| 6,096,287 | * | 8/2000 | Lee et al. . |

FOREIGN PATENT DOCUMENTS

| | | | |
|---|---|---|---|
| 93/01884 | * | 2/1993 | (WO) . |
| 93/02013 | * | 2/1993 | (WO) . |
| 95/36025 | * | 11/1995 | (WO) . |

OTHER PUBLICATIONS

Tanev et al., "A Neutral Templating Route to Mesoporous Molecular Sieves," Science, vol. 267,pp. 965–867, Feb. 1995.*

Coustel et al., "Improved Stability of MCM–41 through Textural Control," J. Chem. Soc., Chem. Commun., pp. 967–968, 1994,*

* cited by examiner

*Primary Examiner*—Mark L. Bell
*Assistant Examiner*—David Sample

(57) ABSTRACT

Process for the preparation of a mesoporous, crystalline, acidic molecular sieve comprising the successive steps of (a) preparing an aqueous mixture comprising a silicon source, a fluorine source, and an organic template at a temperature in the range of at most 90° C. such that crystallization starts; (b) adjusting the pH of the solution to such value in the range of from about 5.0 to about 12.5 that a precipitate is formed; (c) recovering the precipitate; and (d) calcining the precipitate to obtain the mesoporous, crystalline, acidic molecular sieve, wherein an aluminum source is added in one or more of steps (a) and (b) and/or between steps (c) and (d) in such amount that after addition of all aluminum source the Si/Al atomic ratio is at least about 3.

25 Claims, No Drawings

PROCESS FOR THE PREPARATION OF MESOPOROUS MOLECULAR SIEVES AND POROUS CRYSTALLINE MATERIALS

This is a continuation-in-part of application Ser. No. 08/818,854 filed Mar. 17, 1997, the entire disclosure of which is hereby incorporated by reference.

FIELD OF THE INVENTION

The present invention relates to a process for the preparation of mesoporous molecular sieves and to porous crystalline materials, which may be obtained by the same process. More specifically, the present invention relates to a process for preparing mesoporous molecular sieves of an acidic nature and of high crystallinity and to a certain class of such mesoporous molecular sieves, which are stable at high temperatures, thus making them very suitable for use in catalysts.

BACKGROUND OF THE INVENTION

The expression "mesoporous" as used throughout this specification refers to pores having diameters in the range of from 1.5 to 20.0 nm.

Crystalline mesoporous molecular sieves are known in the art. For instance, in International patent specification No. WO 93/02013 a mesoporous molecular sieve is disclosed, which, after calcination, exhibits an X-ray diffraction pattern with the strongest peak (i.e. relative intensity is 100) at a d-spacing $d_1$ of at least 1.8 nm and at least one additional weaker peak (relative intensity up to 49) at a d-spacing $d_2$ such that the ratio $d_2/d_1$ has a value of 0.87 0.06. The molecular sieve is suitably prepared by adding a silicon oxide source and optionally an aluminum oxide source to a solution containing an organic templating agent, followed by agitating the mixture thus obtained for 10 minutes to 6 hours at a temperature of from 0 to 50° C. and a pH of 7 to 14 and finally crystallizing the agitated mixture at a temperature of 50 to 200° C., preferably 95 to 150° C., for 4 to 72 hours. The crystallized material recovered is then calcined to eventually arrive at the crystalline mesoporous molecular sieve envisaged.

In International patent specification No. WO 93/01884 a catalyst composition is disclosed of which the support component comprises a non-layered mesoporous molecular sieve which, in calcined form, exhibits an X-ray diffraction pattern with at least one peak having a relative intensity of 100 at a d-spacing of at least 1.8 nm and which has a benzene sorption capacity greater than 15 grams benzene per 100 grams of the material at 6.7 kPa and 25° C. Several methods are disclosed for preparing the mesoporous material, but all methods typically involve preparing a starting mixture containing the necessary components including an organic templating agent and sources of oxides of silicon and optionally aluminum, followed by crystallization of the material at a pH of at least 9 and at a temperature which suitably is above 50° C., but which—as becomes apparent from the working examples—in practice ranges from 95 to 150° C. Crystallization time ranges from 4 hours (at 105° C.) in example 19 to 192 hours plus an additional period of about 12 hours (at 95° C.) in example 3. In most working examples, however, crystallization temperatures of about 100° C. for periods of time of 20 to 90 hours are applied.

In International patent specification No. WO 95/30625 a process for preparing mesoporous molecular sieves similar to those described in WO 93/01884 is disclosed, wherein the molecular sieve is crystallized at a pH from 3 to 8 from a starting mixture containing a specified amount of fluoride in addition to the required oxide sources and organic templating agent(s). Crystallization conditions typically involve temperatures of from 60 to 250° C., preferably from 90 to 200° C., for a period of time of from 2 to 336 hours, but most suitably from 24 to 120 hours.

Although the prior art processes for preparing mesoporous molecular sieves perform satisfactory, there is still room for improvement, particularly in terms of crystallization temperature and crystallization time. It will be appreciated that lower crystallization temperatures and shorter crystallization times are attractive from an economic perspective. Lower temperatures, namely, require less expensive equipment, whilst shorter crystallization times make higher product yields per unit of time possible. In addition, the high temperature resistance and crystallinity of the prior art mesoporous materials are, though acceptable, not yet at an optimum level. Particularly when applied as support material in catalysts, mesoporous molecular sieves being stable at temperatures up to 100° C. and having increased crystallinity are desired.

SUMMARY OF THE INVENTION

The present invention therefore provides a process for preparing mesoporous molecular sieves at relatively low crystallization temperatures and relatively short crystallization times. More specifically, the present invention aims to provide such process involving crystallization temperatures of at most 90° C., and most suitably of at most 60° C., and crystallization times of at most 10 hours. Furthermore, the present invention aims to provide highly crystalline, acidic, mesoporous molecular sieves which have an excellent thermal stability.

These and other objects have been achieved by the present invention. Accordingly, the present invention relates to a process for the preparation of a mesoporous, crystalline, acidic molecular sieve comprising the successive steps of (a) preparing an aqueous mixture comprising a silicon source, a fluorine source, and an organic template at a temperature in the range of at most 90° C. such that crystallization starts;

(b) adjusting the pH of the solution to such value in the range of from about 5.0 to about 12.5 that a precipitate is formed;

(c) recovering the precipitate; and (d) calcining the precipitate to obtain the mesoporous, crystalline, acidic molecular sieve,
   wherein an aluminum source is added in one or more of steps (a) and (b) and/or between steps (c) and (d) in such amount that after addition of all aluminum source the Si/Al atomic ratio is at least about 3.

Another embodiment of the invention provides for a process for the preparation of a mesoporous, crystalline, acidic molecular sieve comprising the successive steps of (a) preparing an aqueous mixture comprising a silicon source, a fluorine source, and an organic template at a temperature in the range of at most 90° C. such that crystallization starts;

(b) adjusting the pH of the solution to such value in the range of from about 5.0 to about 12.5 that a precipitate is formed;

(c) recovering the precipitate;

(d) subjecting the precipitate to a hydrothermal treatment; and (e) calcining the hydrothermally treated precipitate to obtain the mesoporous, crystalline, acidic molecular sieve, wherein an aluminum source is added in one or more of steps (a) and (b) and/or between steps (c) and (d) in such amount that after addition of all aluminum source the Si/Al atomic ratio is at least about 3.

DESCRIPTION OF THE PREFERRED EMBODIMENTS

As the silicon source any such compound containing silicon, which is known in the art to be useful as a source of silicon, can be used. Accordingly, any oxides, alkoxides and/or halides of silicon may be used as well as ammonium compounds and silicate salts. Specific examples, then, include silica powder or colloidal silica, tetramethylorthosilicate (TMOS), tetraethylorthosilicate (TEOS), tetramethylammonium silicate, sodium silicate and ammoniumhexafluorosilicate. It has, however, been found particularly advantageous to use a silicon source, which is soluble in the synthesis mixture at a temperature of at most 60° C. and the appropriate pH conditions. Using such silicon source results in the aqueous mixture prepared in step (a) to be a clear, aqueous solution. This embodiment is preferred. Accordingly, the preferred silicon sources are those which give a clear solution at the start of the synthesis and prior to pH adjustment, so at the conditions of initial pH and temperature for obtaining the desired material. Examples of such soluble silicon sources, then, include the silicon compounds TMOS, TEOS, tetramethylammonium silicate, sodium silicate and ammoniumhexafluorosilicate.

In addition to the silicon source, the mixture prepared in step (a) also comprises an organic template (R) The organic template is suitably used in such amount that the molar ratio of template to silicon (R/Si) has a value in the range of from 0.01 to 2.0, more suitably 0.05 to 1.0 and most suitably 0.1 to 0.5. The organic template determines to a great extent the pore size of the material eventually obtained. This organic template comprises a main organic template ($R_m$) and optionally one or more auxiliary templates ($R_a$). The main organic template may be any organic compound, known to be useful as template for the formation of molecular sieves. In general, such main template is an ammonium or phosphonium ion characterized by the following general formula $$R_1R_2R_3R_4Q^+$$

wherein:

Q represents nitrogen or phosphorus at least one and at most three of $R_1$, $R_2$, $R_3$ and $R_4$ represent an optionally substituted aryl or alkyl group having from 6 to 24 carbon atoms and each of the remainder of $R_1$, $R_2$, $R_3$ and $R_4$ represents hydrogen or an alkyl group having from 1 to 5 carbon atoms.

Alternatively, the main template is a sulfonium ion of the general formula $$R_1R_2R_3S^+$$

with $R_1$, $R_2$ and $R_3$ as defined hereinbefore with the proviso that at least one of $R_1$, $R_2$ and $R_3$ represents hydrogen or an alkyl group having from 1 to 5 carbon atoms.

The preferred templates are the ammonium and phosphonium ions and of these the most preferred organic templates are those wherein one or two of $R_1$, $R_2$, $R_3$ and $R_4$ are long-chain groups within the definitions given above and the remainder are short-chain alkyl groups, like methyl or ethyl, or hydrogen. Examples of very suitable templates, then, are the decyltrimethylammonium ion, the dodecyltrimethylammonium ion, the cetyltrimethylammonium ion and the N-dodecyl-N-methylephedrinium ion. This latter template has been found to be particularly suitable for preparing acidic mesoporous molecular sieves having a pore size of from 1.5 to 2.5 nm. Other suitable templating agents are the cetyltrimethylphosphonium ion, the octadecyltrimethylammonium ion, the benzyltrimethylammonium ion and the dimethyldidodecylammonium ion.

The compound from which the above ammonium, phosphonium or sulfonium ion is derived may be the hydroxide, halide, silicate or mixtures of two or more of these.

As already stated above, the organic template may also comprises one or more auxiliary organic templates in addition to the main organic template. If present, such auxiliary organic template is an ammonium, phosphonium or sulfonium ion characterized by the same formulas as indicated above, but with each of $R_1$, $R_2$, $R_3$ and $R_4$ (if present) representing hydrogen or an alkyl group having from 1 to 5 carbon atoms. Again, the compound from which this ammonium, phosphonium or sulfonium ion is derived may be the hydroxide, halide, silicate or mixtures of two or more of these. Preferred auxiliary organic templates are ammonium ions, such as ammonium, tetramethylammonium, trimethylammonium, triethylammonium and diethyldimethylammonium, all originating from a corresponding hydroxide, chloride or bromide. If used at all, the auxiliary organic template ($R_a$) may be used in such amount that the molar ratio $R_m/R_a$ is in the range of from 0.01 to 10, preferably from 0.1 to 2.

The aqueous mixture prepared in step (a) may also comprise a fluorine source. Synthesis of molecular sieves in a fluorided medium is known from International patent specification No. WO 95/30625, discussed hereinbefore. As is explained in this International patent specification, an advantage of using a fluorided medium is that the pH of the reaction mixture is less basic (i.e. below 8) than in case a non-fluorided medium is used, thus making it possible to dispense with alkali and/or alkaline earth metal ions as counter ions for the $AlO_2-$. Such counter ions, namely, cause the molecular sieve formed to have hardly any acidity, which in return necessitate ion-exchange with an aqueous ammonium salt solution to remove the alkali and/or alkaline earth metal ions from ion-exchange sites of the molecular sieve, followed by calcination to convert the ammonium ions $NH_4+$ contained in the ion-exchange sites to $H+$. Suitable sources of fluorine are fluoride salts, preferably those which are water-soluble. Accordingly, suitable fluoride salts include ammonium fluoride and sodium fluoride, of which the ammonium fluoride is the preferred salt. It is also possible that a single compound is both silicon source and fluorine source. An example of such a compound is ammoniumhexafluorosilicate. Using a fluoride salt in combination with a compound serving both as silicon source and fluorine source is also a very viable option within the scope of the present invention. The fluorine source is present in such amount that the molar ratio of fluoride ion to silicon ($F^-/Si$) is in the range of from 0 to 6. If present, it is preferred to use the fluorine source is such amount that the $F^-/Si$ molar ratio has a value of at least 0.05.

The temperature applied in step (a) is at most 90° C. It is however, preferred that the temperature applied in step (a) does not exceed 75° C. and most preferably this temperature is at most 60° C. Normally, the temperature will be at least 0° C. and conveniently is at least such that no cooling means are required, which in practice implies a minimum temperature of 15° C. Temperatures below 0° C. may also be applied, provided the synthesis mixture remains in the liquid state.

The aqueous mixture prepared in step (a) most suitably is a clear solution at the temperature and pH at which the crystallization starts. This implies that the components present in this mixture most suitably are soluble in water at the given temperature and pH synthesis conditions.

Crystallization begins during step (a) of the process. Adjusting the pH in step (b) of the present process is necessary in order to propagate the precipitation of the mesoporous solid. The pH should be adjusted to a value in the range of from 5.0 to 12.5, preferably 6.5 to 12.0, whereby the exact value is determined by pH of the reaction mixture before pH adjustment and the type of components present in this reaction mixture. The pH is most suitably adjusted by adding an aqueous acidic, basic or buffer solution to the reaction mixture depending on the desired pH adjustment. In case the pH need to be adjusted to a value which is lower than the pH of the reaction mixture to effect crystallization, then an aqueous acidic solution should be added. This will normally be the case if no fluorine source is present in the reaction mixture. Suitable acidic solutions are aqueous solutions of mineral acids, such as hydrochloric acid, or of organic acids, such as acetic acid or citric acid. If the reaction takes place in a fluorided medium, i.e. the reaction mixture does contain a fluorine source, then the pH will normally have to be increased in order to effect precipitation. A very suitable way of increasing the pH in such a case is by combining the reaction mixture with an aqueous basic buffer solution having a pH which is higher than the pH of the reaction mixture, but which is still below 12.5. Many buffer solutions may be suitably applied for this purpose, but very good results have been obtained with a buffer solution containing ammonium hydroxide ($NH_4OH$) and ammonium chloride ($NH_4Cl$).

Recovery of the precipitate in step (c) may be achieved by well known methods, such as filtration and/or decantation, optionally in combination with washing and drying.

After step (c) and prior to calcination step (d), the precipitate recovered may be subjected to a hydrothermal treatment. The application of such hydrothermal treatment largely depends on the quality of the solid recovered in step (c). If crystallinity and homogeneity of the material recovered in step (c) appear to be sufficiently good, then a hydrothermal treatment can be dispensed with a calcination step can be directly proceeded with. However, especially if the synthesis is carried out in a fluorine-free medium, a hydrothermal treatment of the precipitate recovered in step (c) is advantageously applied. If such hydrothermal treatment is applied, it is usually not necessary to dry the precipitate before subjecting it to the hydrothermal treatment. The precipitate recovered should in any event not be subjected to a calcination treatment before subjecting it to a hydrothermal treatment. If a hydrothermal treatment is applied, at least part of the aluminum source may be added at the start of this treatment.

The hydrothermal treatment suitably applied in the present process essentially involves heating the material to be treated in the presence of water in an autoclave to a temperature of from 60 to 170° C. for a certain period of time, suitably ranging from 1 to 48 hours, more suitably from 6 to 30 hours. The water may be added separately or may be already present in the sample to be treated. An important factor in determining the exact conditions to be applied in the hydrothermal treatment is the presence or absence of any fluorine source in the reaction mixture prepared in step (a). It has been found that when the reaction takes place in a fluorided medium, i.e. the reaction mixture contains a fluorine source, temperatures lower in the 60–170° C. range are preferred. Accordingly, temperatures in the range of from 60 to 90° C., particularly in combination with heating times in the range of from 10 to 30 hours, are preferred. On the other hand, if no fluorine source is present in the reaction mixture, very good results are obtained when heating the precipitate recovered in step (c) to a temperature in the range of from 125 to 165° C. Also in this case heating times of from 10 to 30 hours are most suitably applied.

The aluminum source to be used can be added in one or more of the steps (a) and (b) and/or between steps (c) and (d). The latter option is suitably effected by addition of the aluminum source at the start of the hydrothermal treatment step, if applied. Hence, the aluminum source can be added when preparing the reaction mixture, when adjusting the pH so as to effect precipitation and/or at the start of the hydrothermal treatment. It is added in such amount that after addition of all aluminum source the Si/Al atomic ratio is at least 3 and normally is at most 80. Suitably, the Si/Al atomic ratio has a value in the range of from 5 to 40, preferably from 10 to 35. The purpose of using an aluminum source in the present process is to eventually obtain an acidic material. As is well known in the art, the presence of (covalently bound) alumina moieties in a molecular sieve imparts acidity onto the material. As the aluminum source any oxide, alkoxide, halide, sulphate and/or hydroxide of aluminum may be used and particularly those which give a clear solution at the conditions (temperature, pH) applied at the start of the synthesis reaction. Accordingly, examples of suitable sources of aluminum are alumina powder, aluminum chloride and sodium aluminate, the latter two being preferred sources of aluminum for the purpose of the present invention due to their ability to dissolve in water. As said, the aluminum source can be added in any one of steps (a) and (b) and/or at the start of the possible hydrothermal treatment applied between steps (c) and (d). It is, however, preferred to add the aluminum source in step (a), as this is most efficient from a process point of view.

In addition to the components described above, an alkali- or alkaline earth metal component may also be present. As has already been explained above, the role of alkali or alkaline earth metal ions is to act as counter ions for the $AlO_2^-$ ions present in the molecular sieve formed. Water-soluble salts containing alkali or alkaline earth metal ions may be used as the sources of these ions. The alkali- or alkaline earth metal ion ($M^{m+}$) is present in such amount that the molar ratio of the ion (expressed as oxide, $M_{2/m}O$) to silicon is in the range of from 0 to 1.5. Sodium and potassium are most frequently applied as the alkali metal, with sodium being the preferred metal for the purpose of the present invention. Examples of suitable sources of sodium are sodium hydroxide, sodium silicate, and sodium aluminate, but other salts may be applied as well. Water-soluble compounds may be used as well.

Hence, in a preferred embodiment of the present invention the molar composition of the starting reaction mixture as prepared in step (a) in terms of molar ratio's of the various constituents (expressed as oxides) satisfies the following equation:

$$(0.005-1)R_2O:(0.0063-0.165)Al_2O_3:1\ SiO_2:(0-6)F^-:(0-1.5)M_{2/m}O:(5-1000)H_2O$$

wherein R is the organic template as defined hereinbefore, M is an alkali or alkaline earth metal and m is an integer corresponding with the valency of the alkali or alkaline earth metal. It will be understood that if the aluminum source is added in step (b) or at the start of the hydrothermal treatment step of the present process, the alumina component in the above equation will after step (a) be absent (i.e. the number of moles equals zero).

Calcination in step (d) of the present process can be carried by conventional methods. Suitably, calcination is effected by subjecting the material to be calcined to a temperature of from 400 to 950° C., more suitably 500 to 800° C., for a period of time ranging from 30 minutes to 150 hours. Particularly in case no hydrothermal treatment is applied, calcination for longer periods of time is preferred, i.e. for periods of time up to 150 hours, preferably from 1 hour to 96 hours and more preferably from 4 to 85 hours. If a hydrothermal treatment is applied, shorter calcination times are usually sufficient, i.e. ranging from 30 minutes to 48 hours, more suitably from 1 hour to 24 hours.

It has been found that a hydrothermal treatment has a beneficial effect on the crystallinity of the mesoporous aluminosilicate molecular sieves obtained by the present process. Without wishing to bound by any particular theory, it is believed that the hydrothermal treatment enhances the structuring of the crystal cells, thereby increasing the crystallinity, strength and high temperature resistance of the final molecular sieve.

In a further aspect the present invention relates to a certain specific porous, crystalline materials which may be obtained by the process defined hereinbefore.

As has already been indicated herein before, such materials are known from International patent specifications Nos. WO 93/01884, WO 93/02013 and WO 95/30625. However, as has also been recognized in Coustel et al., J.Chem.Soc., Chem. Commun., 967–968 (1994), such materials suffer from poor thermal stability due to the thickness of the walls between adjacent pores in the crystalline material being insufficient at certain point. As a result, piercing of the pore walls readily occurs, for instance as a result of the thermal treatment necessary to remove the organic templating agent used in the synthesis. The resulting holes in the walls between adjacent pores create an unstable situation and also account for a decreased pore volume which is undesirable for potential application as a catalyst. The method proposed for increasing the wall thickness of the materials involves modifying the activity of the silicoaluminate units in the synthesis mixture. Materials were obtained having, after calcination at 550° C. in air, diameters in the range of from 3.6 to 3.9 nm with pore wall thicknesses varying from 0.4 to 1.6 nm.

As has also been indicated in Coustel et al., J.Chem.Soc., Chem. Commun., 967–968 (1994), the pore wall thickness t (in nm) can be determined with the help of formula (I):

$$t = a - d \qquad (I)$$

wherein:
a is the unit cell constant in nm, calculated by formula (II):

$$a = (2/\sqrt{3}) \ast d100 \qquad (II)$$

with $d_{100}$ representing the $d_{100}$-spacing (in nm) determined from the X-ray diffraction pattern, and
d is the pore diameter in nm, determined by nitrogen adsorption.

It will be appreciated that the wall thickness t as determined by formulas (I) and (II) is an average value which is representative for the entire crystal lattice of the porous crystalline material.

The present invention aims to provide similar porous, crystalline materials, but with a further increased pore wall thickness resulting in increased thermal stability and hence improved suitability for use in catalysts for hydrocarbon conversion processes.

Accordingly, the present invention further relates to a porous, crystalline material exhibiting an X-ray diffraction pattern after calcination with the strongest peak having a relative intensity of 100 at a $d_{100}$-spacing of at least 2.7 nm and with no peaks at d-spacings below 1.0 nm having a relative intensity of more than 20% of the strongest peak, wherein the material has a Si/Al atomic ratio of at least 3 and pores having a diameter of from 1.5 to 10.0 nm with the pore wall thickness being greater than 1.6 nm.

The pore size or pore diameter can be varied by varying the type of main organic template and by the possible use of an auxiliary organic template $R_a$ in addition to the main organic templating agent $R_m$. Preferably, the pore diameter ranges from 1.5 to 5.0 nm.

Preferred materials further have a Si/Al atomic ratio of from 3 to 80, more preferably from 5 to 40 and most preferably from 10 to 35. The strongest peak in the X-ray diffraction pattern preferably is at a $d_{100}$-spacing not exceeding 11.0 nm, while $d_{100}$-spacings of from 3.0 to 7.0 nm, and particularly from 3.0 to 5.0 nm, have been found especially advantageous. Normally, the pore wall thickness will not exceed 2.5 nm. Materials having a pore wall thickness between 1.6 and 2.2 nm, however, are preferred.

The porous crystalline materials of the present invention may be, and suitably are, obtained by the method, which also forms one aspect of the present invention and which has been extensively described hereinbefore. The chemical composition of the mesoporous aluminosilicate molecular sieve eventually obtained after step (d) can then be expressed as follows:

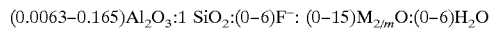

with M and m as defined above. A preferred molecular sieve satisfies the following equation:

The present porous crystalline molecular sieve is very suitable for use as catalyst or catalyst carrier as it can possess varying levels of acidity due to the presence of aluminum in the lattice. Accordingly, the present invention also relates to the use of this porous crystalline molecular sieve as catalyst or catalyst carrier and to catalysts and catalyst carriers comprising this porous crystalline molecular sieve. For this purpose the molecular sieve may be composited with a matrix material, such as alumina, silica or silica-alumina. In addition, a hydrogenation-dehydrogenation function may be present in the form of one or more catalytically active metals, such as those from Group VIB or VIII of the Periodic Table of Elements. In a preferred embodiment the present molecular sieve is used in combination with a hydrogenation/dehydrogenation function as a hydroprocessing catalyst for hydroprocessing of mineral or synthetic oil feedstocks. The term "hydroprocessing" as used in this connection refers to hydrotreating including hydrogenation, hydrodesulfurization and hydrodenitrogenation- hydrocracking and hydroisomerization. Of particular interest for application of the present molecular sieve as catalysts are hydrocracking and hydroisomerization processes for producing lubricating base oils from flashed distillates and/or waxy feedstocks, such as slack waxes. Other applications of the present molecular sieve include its use as an adsorbent or as a component in a washing composition, while application in catalysts for fluidized catalytic cracking processes may also be considered.

The invention will now be illustrated by the following examples without restricting the scope of the invention to these particular embodiments.

EXAMPLE 1

39.18 g of cetyltrimethylammonium bromide (CTMABr) were dissolved in a solution containing 1070 ml of deionized water and 8.24 g of sodium hydroxide. The mixture was slightly heated to 40–50° C. under stirring for 5 minutes. The mixture was then added to 102.70 g of a sodium silicate solution (29.25% wt, $SiO_2$, 8.86% wt $Na_2O$, 61.88% wt $H_2O$) and a precipitate was subsequently obtained. This precipitate was dissolved by heating the mixture to 55° C. and maintaining this temperature for 5 minutes under stirring. The result was a clear solution having the following molar composition:

1.0 $SiO_2$:0.5 $Na_2O$:0.215 CTMABr:126 $H_2O$ 250 ml of an aqueous sodium aluminate solution ($NaAlO_2$, 0.1 mol/l) and 325 ml of hydrochloric acid (1.0 mol/l) were added simultaneously to arrive at a solution having a Si/Al atomic ratio of 20 and a pH of 11.0. A white precipitate was formed. The volume of the mixture was reduced to 750 ml by decantation and filtration.

This mixture was then subjected to a hydrothermal treatment by heating it in an autoclave at 150° C. for 24 hours under autogeneous pressure. Hereafter the autoclave was cooled to room temperature and the product was filtrated and washed four times with water. The white powder obtained was subsequently calcined at 700° C. for 6 hours under air.

The mesoporous aluminosilicate molecular sieve obtained had a surface area of 950 m²/g, a total pore volume of 1.1 ml/g and a pore size (d), as determined by nitrogen adsorption, of 3.0 nm.

The $d_{hk0}$-spacings at various hk0 projections and their relative intensities $I_{rel}$ in the X-ray diffraction (XRD) pattern of the calcined material are indicated in Table I.

TABLE I

XRD pattern Example 1

| d-spacing (nm) | | $I_{rel}$ |
| --- | --- | --- |
| $d_{100}$ | 4.28 | 100 |
| $d_{110}$ | 2.51 | 21 |
| $d_{200}$ | 2.16 | 14 |
| $d_{210}$ | 1.66 | 7 |

Table I shows that there is one very strong peak corresponding with the $d_{100}$-spacing, which implies that the mesoporous solid obtained after the hydrothermal treatment has excellent crystallinity, i.e. a highly organized structure.

The very high pore volume after calcination at such high temperature as 700° C. already shows that the material has an excellent thermal resistance. This was further illustrated by the pore wall thickness t, which can be determined by means of formulas (I) and (II):

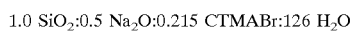
$t=a-d=[(2/\square 3)*4.28]-3.0=1.9$ nm.

This high pore wall thickness also illustrates the excellent thermal stability of the material.

EXAMPLE 2

An aqueous solution of ammonium hexafluorosilicate (($NH_4)_2SiF_6$) and an aqueous solution of CTMABr were mixed to give a clear solution having a pH of 4 and the following composition:

1.0 $(NH_4)_2SiF_6$:0.215 CTMABr:125 $H_2O$

To this mixture was added hydrated aluminum trichloride ($AlCl_3 \cdot 6H_2O$) in such amount that the Si/Al atomic ratio was 20 and 150 ml of a 0.5 N buffer solution of ammonium hydroxide/ammonium chloride having a pH of 9.7. The resulting mixture gave a white precipitate and was aged at room temperature (approximately 25° C.) for 1 hour under stirring. The precipitate was filtered off and washed with water and was subsequently subjected to a hydrothermal treatment by keeping it for 24 hours in an autoclave at 70° C. in the presence of water. The material was then washed and dried and calcined for 4 hours at 600° C.

The resulting mesoporous aluminosilicate molecular sieve obtained had a surface area of 960 m²/g, a total pore volume of 0.51 ml/g and a pore size (d), as determined by nitrogen adsorption, of 2.5 nm. It was a highly crystalline material having an XRD pattern showing an intense peak at a $d_{100}$-spacing of 3.85 nm.

The still high pore volume after calcination at such high temperature as 600° C. shows that the material has a good thermal resistance. This is also illustrated by the pore wall thickness t, which can be determined by means of formulas (I) and (II):

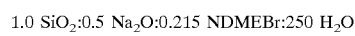
$t=a-d=[(2/\square 3)*3.85]-2.5=1.9$ nm.

EXAMPLE 3

This example shows that the use of N-dodecyl-N-methylephedrinium ion as templating agent results in a crystalline molecular sieve having a very low pore size.

A solution of N-dodecyl-N-methylephedrinium bromide (NDMEBr) in water (dissolving required heating to 50–60° C.) was added to an aqueous solution of sodium silicate to obtain a mixture having the following molar composition:

1.0 $SiO_2$:0.5 $Na_2O$:0.215 NDMEBr:250 $H_2O$

To this mixture was added a solution of sodium aluminate in such amount that the Si/Al atomic ratio was about 30. The resulting mixture was heated up to 60° C. until a clear, viscous solution was obtained. The pH of the solution was 12. The solution was subsequently cooled to 25° C. Then the pH was adjusted to 8.5 with 0.1 mol/l hydrochloric acid solution and a white precipitate was formed. The precipitate was filtrated, washed with deionized water and dried. The dry white powder obtained was subsequently calcined at 700° C. for 6 hours in air.

The resulting acidic mesoporous solid was a crystalline material having a pore size (d), as determined by nitrogen adsorption, of only 1.5 nm.

What is claimed is:

1. A process for the preparation of a mesoporous, crystalline, acidic molecular sieve comprising the successive steps of
   (a) preparing an aqueous mixture comprising a silicon source, a fluorine source, and an organic template at a temperature in the range of at most 90° C. such that crystallization starts;
   (b) adjusting the pH of the solution to such value in the range of from about 5.0 to about 12.5 that a precipitate is formed;
   (c) recovering the precipitate; and
   (d) calcining the precipitate to obtain the mesoporous, crystalline, acidic molecular sieve, wherein an aluminum source is added in one or more of steps (a) and (b) and/or between steps (c) and (d) in such amount that after addition of all aluminum source the Si/Al atomic ratio is at least about 3.

2. The process according to claim 1, wherein the precipitate recovered in step (c) is subjected to a hydrothermal treatment prior to calcination.

3. The process according to claim 2, wherein at least part of the aluminum source is added at the start of the hydrothermal treatment.

4. The process according to claim 1, wherein the fluorine source is a fluoride salt.

5. The process according to claim 1, wherein a single compound is both fluorine source and silicon source.

6. The process according to claim 5, wherein ammoniumhexafluorosilicate is the fluorine source and silicon source.

7. The process according to claim 2, wherein the hydrothermal treatment is carried out at a temperature in the range of from about 60 to about 90° C.

8. The process according to claim 1, wherein the organic template comprises a main organic template ($R_m$) characterized by one of the general formulas $$R_1R_2R_3R_4Q^+$$

wherein:

Q represents nitrogen or phosphorus at least one and at most three of $R_1$, $R_2$, $R_3$ and $R_4$ represent a substituted or unsubstituted aryl or alkyl group having from 6 to 36 carbon atoms and each of the remainder of $R_1$, $R_2$, $R_3$ and $R_4$ represents hydrogen or an alkyl group having from 1 to 5 carbon atoms or $$R_1R_2R_3S^+$$

wherein:

$R_1, R_2$ and $R_3$ are as defined above with the proviso that at least one of $R_1, R_2$ and $R_3$ represents hydrogen or an alkyl group having from 1 to 5 carbon atoms.

9. The process according to claim 8, wherein $R_m$ is selected from the group consisting of the dodecyltrimethylammonium ion, the cetyltrimethylammonium ion and the N-dodecyl-N-methylephedrinium ion.

10. The process according to claim 1, wherein the pH in step (b) is adjusted to a value in the range of from about 8.0 to about 12.0.

11. The process according to claim 2, wherein the hydrothermal treatment is carried out at a temperature in the range of from about 125 to about 165° C.

12. The process according to claim 1, wherein the aluminum source is added in such amount that after addition of all aluminum source the Si/Al atomic ratio is in the range of from about 5 to about 40.

13. The process according to claim 1, wherein the fluorine source is ammonium fluoride.

14. A process for the preparation of a mesoporous, crystalline, acidic molecular sieve comprising the successive steps of (a) preparing an aqueous mixture comprising a silicon source, a fluorine source, and an organic template at a temperature in the range of at most 90° C. such that crystallization starts;

(b) adjusting the pH of the solution to such value in the range of from about 5.0 to about 12.5 that a precipitate is formed;

(c) recovering the precipitate;

(d) subjecting the precipitate to a hydrothermal treatment; and (e) calcining the hydrothermally treated precipitate to obtain the mesoporous, crystalline, acidic molecular sieve, wherein an aluminum source is added in one or more of steps (a) and (b) and/or between steps (c) and (d) in such amount that after addition of all aluminum source the Si/Al atomic ratio is at least about 3.

15. The process according to claim 14, wherein at least part of the aluminum source is added at the start of the hydrothermal treatment.

16. The process according to claim 14, wherein the aluminum source is added in such amount that after addition of all aluminum source the Si/Al atomic ratio is in the range of from about 5 to about 40.

17. The process according to claim 14, wherein the fluorine source is a fluoride salt.

18. The process according to claim 14, wherein the fluorine source is ammonium fluoride.

19. The process according to claim 14, wherein a single compound is both fluorine source and silicon source.

20. The process according to claim 19, wherein ammoniumhexafluorosilicate is the fluorine source and silicon source.

21. The process according to claim 14, wherein the hydrothermal treatment is carried out at a temperature in the range of from about 60 to about 90° C.

22. The process according to claim 14, wherein the hydrothermal treatment is carried out at a temperature in the range of from about 125 to about 165° C.

23. The process according to claim 14, wherein the pH in step (b) is adjusted to a value in the range of from about 8.0 to about 12.0.

24. The process according to claim 14, wherein the organic template comprises a main organic template ($R_m$) characterized by one of the general formulas $$R_1R_2R_3R_4Q^+$$

wherein:

Q represents nitrogen or phosphorus at least one and at most three of $R_1$, $R_2$, $R_3$ and $R_4$ represent a substituted or unsubstituted aryl or alkyl group having from 6 to 36 carbon atoms and each of the remainder of $R_1$, $R_2$, $R_3$ and $R_4$ represents hydrogen or an alkyl group having from 1 to 5 carbon atoms or $$R_1R_2R_3S^+$$

wherein:

$R_1, R_2$ and $R_3$ are as defined above with the proviso that at least one of $R_1, R_2$ and $R_3$ represents hydrogen or an alkyl group having from 1 to 5 carbon atoms.

25. The process according to claim 24, wherein $R_m$ is selected from the group consisting of the dodecyltrimethylammonium ion, the cetyltrimethylammonium ion and the N-dodecyl-N-methylephedrinium ion.

* * * * *